United States Patent [19]

Podgers

[11] Patent Number: 4,899,792
[45] Date of Patent: Feb. 13, 1990

[54] FUELING NOZZLE PROVIDING COMBINATION BREAKAWAY AND SWIVEL COUPLING

[75] Inventor: Alexander R. Podgers, Lake City, Pa.

[73] Assignee: Emco Wheaton, Inc., Conneaut, Ohio

[21] Appl. No.: 161,755

[22] Filed: Feb. 29, 1988

[51] Int. Cl.$^4$ .................. F16K 17/14; F16K 13/04
[52] U.S. Cl. .................... 141/382; 141/206; 141/311 R; 137/68.1; 285/2; 285/272
[58] Field of Search ............... 141/311 R, 98, 392, 141/206, 383, 385, 384, 387, 386, 382; 137/68.1, 797; 285/1-4, 272, 278, 279, 280, 281, 275, 319, 320

[56] References Cited

U.S. PATENT DOCUMENTS

| | | | |
|---|---|---|---|
| 1,637,908 | 8/1927 | Lea | 141/385 X |
| 1,941,132 | 12/1933 | Creveling | 141/385 X |
| 2,666,656 | 1/1954 | Bruning | 285/1 X |
| 3,234,965 | 2/1966 | Anderson | 285/319 X |
| 3,537,478 | 11/1970 | Evans et al. | 285/1 X |
| 3,781,039 | 12/1973 | Locke et al. | 285/1 |
| 3,842,614 | 10/1974 | Knecher et al. | 285/312 X |
| 4,449,545 | 5/1984 | Vernor et al. | 137/68.1 |
| 4,614,201 | 9/1986 | King et al. | 137/68.1 |
| 4,617,975 | 10/1986 | Rabushka et al. | 141/311 R |
| 4,646,773 | 3/1987 | Klop et al. | 137/68.1 |
| 4,682,795 | 7/1987 | Rabushka et al. | 285/1 |
| 4,691,941 | 9/1987 | Rabushka et al. | 285/1 |
| 4,763,683 | 8/1988 | Carmack | 137/68.1 |
| 4,779,638 | 10/1988 | Nitzberg et al. | 137/68.1 |

FOREIGN PATENT DOCUMENTS 0206582 12/1986 European Pat. Off. ............. 285/1
3444796 4/1986 Fed. Rep. of Germany ...... 285/312

*Primary Examiner*—Ernest G. Cusick
*Attorney, Agent, or Firm*—Pearne, Gordon, McCoy & Granger

[57] ABSTRACT

A combination breakaway and swivel coupling for vehicle fueling systems is disclosed. The coupling includes a body having a swivel connection at one end and a breakaway connection at the other end. The swivel is directly connected to a vehicle fueling nozzle and the breakaway coupling is connected to the supply hose of the fueling system. The swivel coupling is a ball-and-socket type coupling which permits the nozzle to be moved in all directions with respect to the supply hose for convenient positioning of the nozzle in the vehicle during fueling and hanging of the nozzle on the pump when the unit is not is use. The breakaway coupling automatically separates in the event that the vehicle drives away without removing the nozzle and prevents damage to the hose and the pump structure. Automatic shutoff valves close when the breakaway coupling releases to prevent pollution or hazardous spills of fuel. One embodiment utilizes a frangible connection which fractures and releases when breakaway occurs. Three other embodiments illustrate a resilient type connection which permits reassembly without replacement of any component parts.

17 Claims, 4 Drawing Sheets

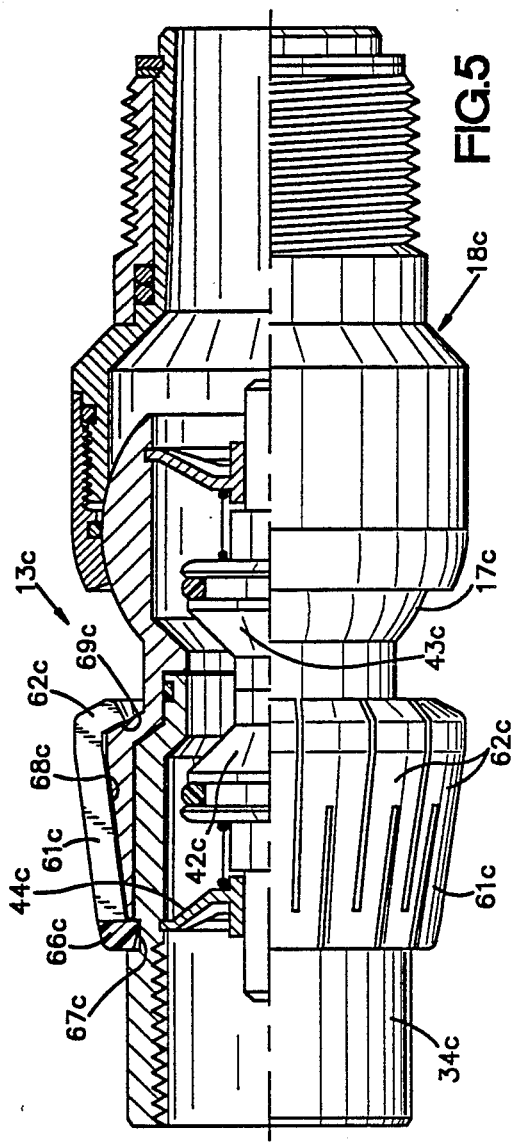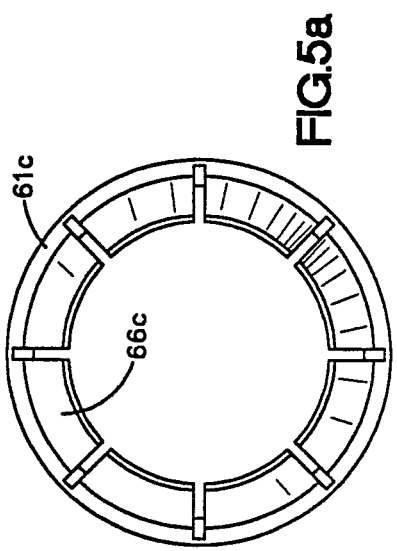

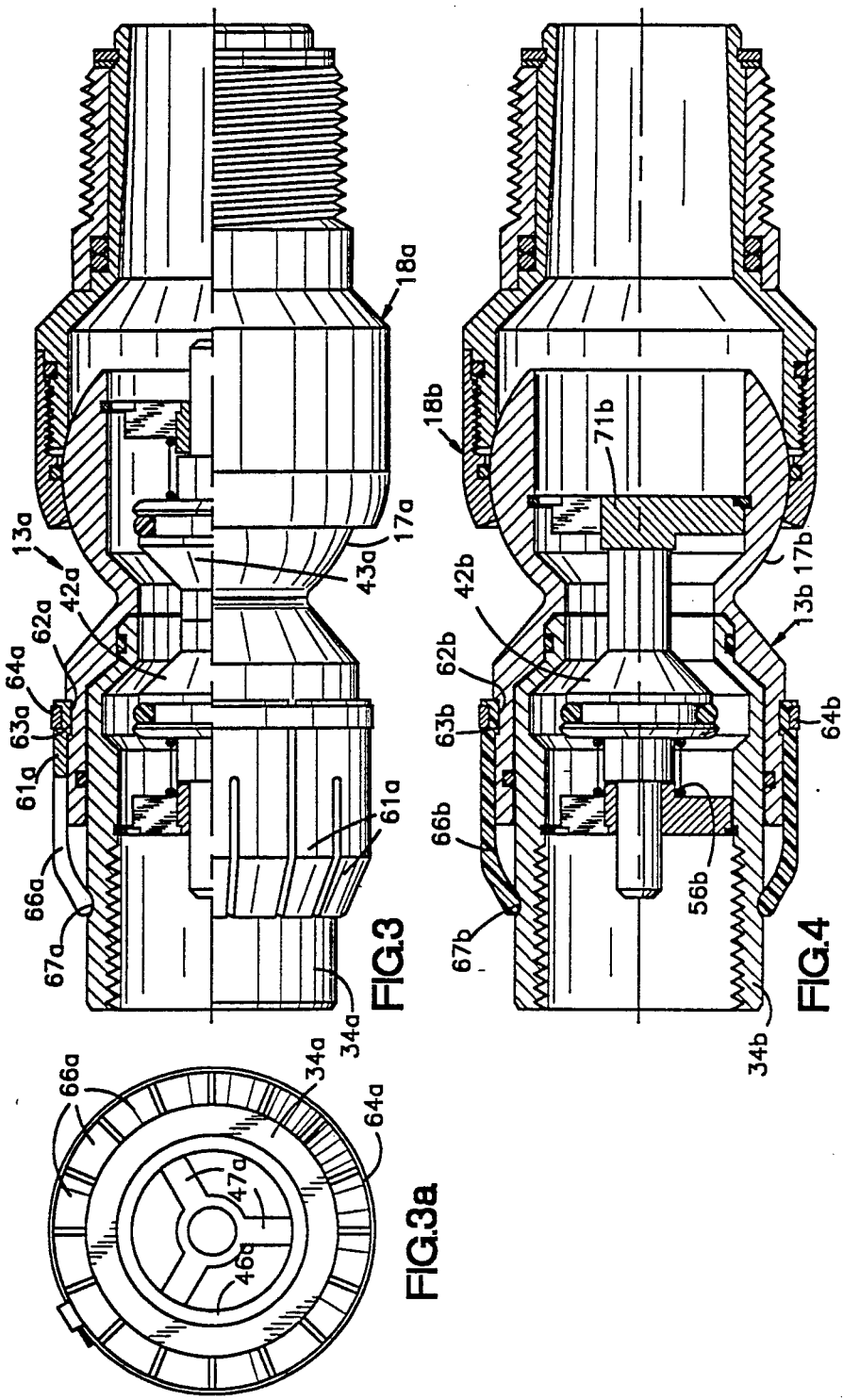

FUELING NOZZLE PROVIDING COMBINATION BREAKAWAY AND SWIVEL COUPLING

BACKGROUND OF THE INVENTION

This invention relates generally to fueling systems for vehicles and the like, and more particularly to a novel and improved breakaway-swivel connection for fuel nozzles.

PRIOR ART

Fuel nozzles used in service stations for fueling vehicles are sometimes left in the fuel tank of the vehicle when the vehicle is driven away from the pump. In some cases, the nozzle merely pulls out of the vehicle tank and drops to the ground. In other instances, however, the nozzle remains in the tank and is carried away with the vehicle. When this occurs, the connecting hose may be broken or the pump pulled off its mounting. In either event, substantial damage results and substantial amounts of fuel can spill onto the ground, where it presents both a pollution and fire hazard.

In order to prevent extensive damage to the dispensing systems and dangerous fuel spills, breakaway systems have been provided which release the nozzle from the pump before material damage occurs. Such breakaway systems also provide automatic valves which close and prevent excessive spills when the breakaway occurs. Examples of such systems are illustrated in U.S. Pat. Nos. 4,449,545 and 4,617,975.

It is also known to provide swivel connections between the supply hose and the nozzle to provide ease in the handling and hanging of the nozzle. In some instances, the swivel is provided by a pivot-type structure, and in other instances the swivel connection is provided by a ball-and-socket type structure.

Separate swivel and breakaway devices each require two system connections, each of which produces the possibility of leakage. Further, separate units each require separate body structures. Still further, when the breakaway device is located remote from the nozzle, dual shutoff valves are required to prevent leakage of the fuel between the nozzle and the breakaway device.

SUMMARY OF THE INVENTION

In accordance with the present invention, a novel and improved combined breakway-swivel is provided for fuel dispensing systems for fueling vehicles and the like. In accordance with this invention, a structure is provided which combines a breakaway coupling with a full swiveling connection. Therefore, two separate body systems are not required and the structure is simplified when compared to separate breakaway devices and swivel devices.

Further, since the unit is combined, the number of connections required is reduced, and the possibility of leakage at connections is therefore reduced. Still further, with the preferred embodiment of this invention, the breakaway connection is provided immediately adjacent to the nozzle. Therefore, a single shutoff valve which closes the connected hose prevents any substantial fuel spill. Since the nozzle contains only a small amount of fuel, spillage from the nozzle does not result in any significant spill. However, in two illustrated embodiments, a shutoff valve is provided in each of the breakaway components, and in such embodiments, virtually all spillage is prevented.

In one embodiment of the invention, a frangible structure releasably connects the two components of the breakaway unit. Such embodiment can be reused by replacing the shear elements during reassembly of the unit.

In other embodiments, a structure is provided which can be reassembled without replacement parts. In one such embodiment, an elastic girdle provides the breakaway connection. In another similar embodiment, the breakaway connection is provided by a girdle spring formed with flexible fingers.

With the present invention, a reliable, relatively simply structure is provided for both the swivel and the breakaway functional components of the system.

These and other aspects of this invention are illustrated in the accompanying drawings, and are more fully described in the following specification.

BRIEF DESCRIPTION OF THE DRAWINGS

FIG. 3 is a side elevation partially in longitudinal section of a second embodiment of the swivel and breakaway unit in its operative condition;

FIG. 3a is an end view of the swivel and breakaway unit of FIG. 3;

FIG. 4 is a longitudinal section of a third embodiment swivel and breakaway unit in accordance with this invention;

FIG. 5 is a side elevation partially in longitudinal section of a fourth embodiment of the swivel and breakaway unit in accordance with this invention; and FIG. 5a is an end view of the swivel and breakaway unit of FIG. 5.

DETAILED DESCRIPTION OF THE DRAWINGS

Figure 1:
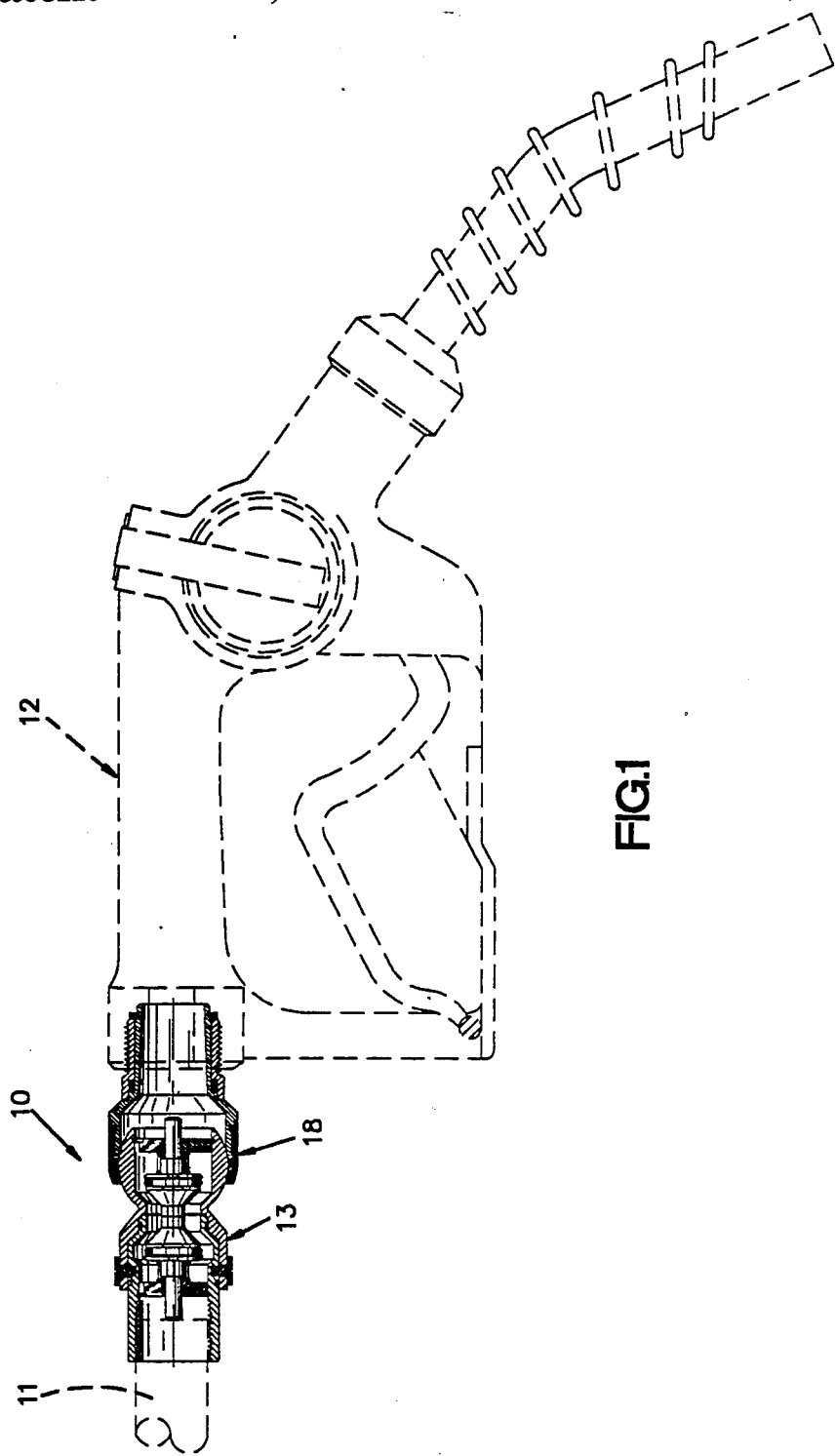
FIG. 1 illustrates a swivel and breakaway unit in accordance with the first embodiment of this invention connected to a conventional fuel dispensing nozzle, which is illustrated in phantom.

FIG. 1 illustrates a first embodiment swivel and breakaway unit 10 in accordance with this invention interconnecting a flexible hose 11 and a conventional fuel dispensing nozzle 12. Typically, the hose 11 is connected to a fuel storage tank through a pump which supplies fuel under pressure to the hose and, in turn, to the nozzle 12. The nozzle 12 may be of any conventional design, and usually includes an automatic shutoff mechanism which closes the flow controlling valve within the nozzle when the vehicle fuel tank is filled. The particular nozzle design is not critical to this invention, and is therefore illustrated in phantom. Such nozzles, however, are well known to persons skilled in the art.

Figure 2:
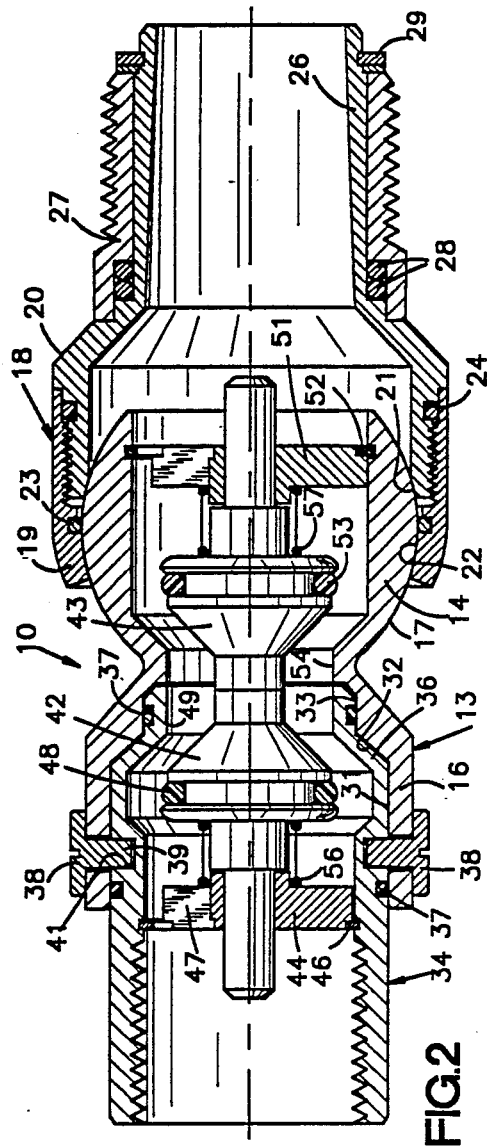
FIG. 2 is an enlarged, longitudinal section of the swivel and breakaway unit illustrated in FIG. 1 in its normal operative condition.
Figure 2A:
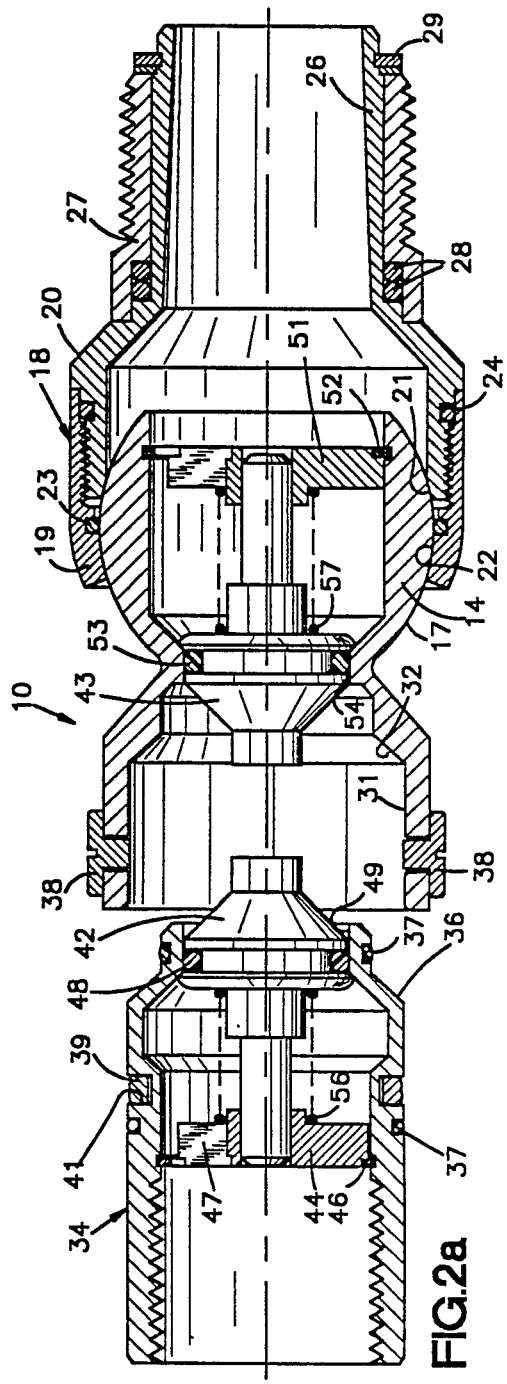
FIG. 2a is a longitudinal section similar to FIG. 2 but illustrating the unit after a breakaway has occurred.

FIGS. 2 and 2a illustrate the structural detail of a first embodiment of this invention. The swivel and breakaway unit 10 includes a body 13 providing a ball-type swivel portion 14 at one end and a breakaway socket portion 16 at its other end. The swivel portion 14 provides an outer surface 17 which is a portion of a sphere along which a swivel assembly 18 can move relative to the body 13 in all directions.

The swivel assembly 18 includes a gland nut 19 threaded onto a tubular fitting member 20. The end of the tubular fitting member 20 is formed with an annular portion of a sphere 21 which fits against the spherical portion 17 of the body 13 and cooperates with an opposed annular spherical portion 22 on the gland nut 19 to interconnect the swivel assembly 18 and the body 13 while allowing full swiveling movement therebetween. An O-ring 23 mounted in the gland nut 19 provides a dynamic fluid seal between the body 13 and the swivel assembly 18. A second O-ring 24 provides a static seal between the gland nut 19 and the fitting member 20.

The other end of the fitting member 20 is provided with a tubular end 26 surrounded by an externally threaded tube nut 27 which is adapted to be threaded into the inlet opening of the nozzle 12. A pair of O-ring seals 28 provide a fluidtight joint between the tube nut 27 and the tubular end 26 while allowing relative rotation therebetween. A snap ring 29 locks the tube nut 27 in its mounted and illustrated position on the tubular end 26.

The breakaway socket portion of the body 13 is formed with a cylindrical bore 31 extending longitudinally to a conical surface 32. Extending inwardly from the conical surface 32 is a cylindrical bore extension 33. A breakaway fitting 34 is provided with an inner end 36 which extends into and mates with the cylindrical bore 31, the conical surface 32, and the bore extension 33. The outer end of the breakaway fitting 34 is internally threaded to receive the end of the hose 11. O-rings 37 provide a fluidtight joint between the breakaway fitting 34 and the body 13.

Mounted on opposite sides of the breakaway socket portion 16 of the body 13 are threaded shear bolts 38 which are threaded into the wall of the socket portion 16 and provide unthreaded ends 39 which project into blind bores 41 formed in the breakaway fitting 34. In normal operation of the unit 10, the shear bolts 38 retain the breakaway fitting 34 in the body 13. However, these bolts are formed of material and sized to provide a frangible connection which breaks when a predetermined axial load is applied between the breakaway fitting 34 and the body 13, as discussed in greater detail below.

Positioned within the unit 10 are a pair of opposed poppet valves 42 and 43 which are maintained in the open position illustrated in FIG. 2 during the normal operation of the unit. The poppet valve 42 is supported within the breakaway fitting 34 by a guide 44. Such guide permits longitudinal movement of the poppet 42 while laterally positioning the poppet within the breakaway fitting 34. The guide 44 is retained within the breakaway fitting 34 by a snap ring 46, and provides symmetrically located legs 47 which extend from the central hub portion of the guide to the wall of the breakaway fitting so that free fluid flow can occur past the guide. Preferably, three such legs 47 are provided.

Mounted on a head portion of the poppet 42 is an O-ring seal 48 which is normally spaced from a cylindrical valve seat 49, as illustrated in FIG. 2. However, when breakaway occurs, the O-ring seal 48 moves into the cylindrical valve seat 49, as illustrated in FIG. 2a, to seal the end of the breakaway fitting 34.

The poppet valve 43 has a similar but opposite structure, and is guided within the body portion 13 by a guide 51 secured in position by a snap ring 52. Here again, the poppet valve 43 is provided with an O-ring seal 53 which is normally spaced from a cylindrical valve seat 54 but is movable into engagement with such valve seat to seal the body against back flow of fuel when breakaway occurs.

In normal operation, the forward ends of the two valve poppets 42 and 43 engage and mutually hold the poppet valves open, as illustrated in FIG. 2. However, when a breakaway occurs, causing the breakaway fitting 34 to pull out of the body 13, the valve poppets 42 and 43 move to their extended and closed condition under the influence of associated springs 56 and 57.

In normal operation, the unit 10 is in the condition illustrated in FIG. 2, and connects the hose 11 with the nozzle 12. In such condition, the two poppet valves 42 and 43 remain open and free flow of fuel can occur through the unit whenever the valve in the nozzle 12 is opened. Under such conditions, full swiveling movement is permitted between the nozzle 12 and the unit 10, and the nozzle can be conveniently moved to any orientation for convenient fueling of a vehicle or hanging of a nozzle when it is not in use.

In the event that the nozzle 12 is not removed from the vehicle and remains in the vehicle as the vehicle drives away, a separation force is created which is sufficient to cause the projecting ends 39 to shear before damage to the hose or the pump unit occurs. When the projecting ends 39 shear, the breakaway fitting 34 separates from the body 13, as illustrated in FIG. 2a. As this occurs, the two poppets 42 and 43 move to their closed condition, sealing off both the nozzle 12 and the hose 11 so that a fuel spill cannot occur.

After a breakaway has occurred, the unit 10 can be reassembled by merely removing the broken parts of the shear bolts 38 and reassembling the unit with new shear bolts 38.

FIGS. 3 and 3a illustrate a second embodiment of this invention which can be reassembled after a breakaway occurrence without replacing any parts. In this embodiment, similar reference numerals are used to refer to parts corresponding to the parts of the first embodiment, but an "a" is added to indicate that the reference is to the second embodiment.

The basic structure of the second embodiment is the same as in the first embodiment in that most of the component parts are identical to the corresponding components of the first embodiment. The swivel assembly 18a is mounted on and seals with a spherical portion 17a on the body 13a. Further, poppets 42a and 43a are identically formed and identically mounted within the body 13a and the breakaway fitting 34a. In this second embodiment, however, a different form of releasable connection is provided in which release and reassembly can occur without any replacement of parts.

In this second embodiment, a girdle spring 61a provides a flange 62a positioned within a peripheral groove 63a formed in the body 13a. A strap 64a permanently secures the girdle spring 61a in its mounted position.

The girdle spring 61a provides a plurality of longitudinally extending, resilient fingers 66a which provide free ends positioned within a shallow peripheral groove 67a in the breakaway fitting 34a. The interengagement between the fingers 66a and the mating walls of the shallow groove 67a prevents separation of the breakaway fitting 34a under normal use conditions. However, when a predetermined separating force is applied, the fingers 66a are cammed radially, allowing the body 13a and the breakaway fitting 34a to axially separate. The fingers 66a are sized and shaped so that such predetermined force required to produce separation is not sufficient to cause damage to either the hose or the pump station.

When separation occurs, the two poppet valves 42a and 43a close and prevent spillage of fuel either from the hose or from the nozzle.

Reassembly of this embodiment is easily accomplished by merely pressing the breakaway fitting 34a back into the body 13a. To facilitate such reassembly, the ends of the fingers 66a are rounded so that they are cammed outwardly to allow such insertion. Once the breakaway fitting 34a is fully inserted into the body 13a, the valves 42a and 43a reopen and the fingers 66a snap back into the peripheral groove 67a to again lock the unit together for normal use.

FIG. 4 illustrates a third embodiment. Here again, similar reference numerals are used to refer to similar components in this embodiment, but a "b" will be added to indicate reference to the third embodiment.

The swivel structure provided by the swivel assembly 18b and the spherical surface 17b is identical to the preceding two embodiments. In this embodiment, however, a girdle spring 66b is formed of elastomeric material so that the separate resilient fingers 66a of the second embodiment are not required. Instead, the girdle spring 66b is an annular member extending uniformly around the entire periphery. Such structure provides a smooth finished appearance.

Here again, the girdle spring 66b is provided with an inwardly extending projection 62b positioned within a peripheral groove 63b in the breakaway fitting 34b. A nonelastic band 64b operates to maintain the projection 62b in the groove 63b to ensure that the girdle spring is permanently mounted on the body 13b.

The end of the girdle spring 66b is positioned within a shallow groove 67b to retain the breakaway fitting 34b in its mounted position during normal operation. However, when a predetermined separating force is applied, the end of the girdle spring 66b is cammed and stretched outwardly to allow the body 13b and the breakaway fitting 34b to separate.

Here again, reassembly of the separated units is accomplished by merely pressing the breakaway fitting inwardly toward its installed position until the end of the girdle spring 66b is again positioned within the shallow groove 67b.

In this third embodiment, a modified and simplified valve system is provided to prevent spillage when breakaway occurs. In this embodiment, only a single poppet valve 42b is provided. When the unit is assembled, the forward end of the poppet valve 42b engages a stop member 71b mounted in the body 13b. The various elements are proportioned so that when the unit is assembled, the stop 71b maintains the poppet 42b in its open position, allowing free flow of fuel through the unit.

When separation occurs, the spring 56b causes the poppet 42b to close. This embodiment in which only a single poppet valve is provided prevents significant spills from occurring during breakaway, since only a very small amount of fuel is actually contained within the nozzle itself and significant amounts of fuel are not spilled because the supply of fuel in the hose 11 is sealed off as soon as breakaway occurs.

FIGS. 5 and 5A illustrate a fourth embodiment of this invention. Once again, similar reference numerals are used to refer to parts corresponding to earlier embodiments, but a "c" is added to indicate that the reference is to the fourth embodiment. The basic structure of the fourth embodiment is the same as in the previous embodiments. The swivel structure provided by the swivel assembly 18c and the spherical surface 17c is identical to the preceding two embodiments.

In place of the girdle spring of the previous embodiments, a cover retainer 61c is used. The retainer 61c has at one end a plurality of long, longitudinally extending, resilient fingers 62c positioned along a frustoconical inclined portion 68c along the exterior of the body 13c. The free ends of the long fingers 62c extend inwardly and are positioned along the frustoconical tapered portion 69c of the body 13c to releasably hold the retainer 61c around the exterior of the body. The retainer 61c also has at the other end a plurality of short, resilient fingers 66c which engage a shallow peripheral groove 67c in the breakaway fitting 34c.

The interengagement between the short fingers 66c and the shallow groove 67c prevents separation of the breakaway fitting 34c during normal use. When a predetermined separating force is applied, the long fingers 62c are cammed radially, allowing the body 13c and the breakaway fitting 34c to axially separate. When separation occurs, the two poppet valves 42c and 43c close and prevent spillage of fuel. The predetermined separating force depends upon angle of the tapered portion 69c. For example, using an angle of about 60 degrees, approximately 150 pounds of separating force is required.

Reassembly of the unit is accomplished by pressing the breakaway fitting 34c back into the body 13c, and pushing the long fingers 62c over the inclined portion 68c of the body until the free ends snap over the tapered portion 69c. The portion 68c has a gradual incline to minimize the amount of force required for reassembly. Once the breakaway fitting 34c is fully inserted into the body 13c, the valves 42c and 43c reopen.

The cover retainer is preferably formed by an injection molding process using suitable plastic resin. The material used, as well as the angles of the portions 68c and 69c and of the corresponding portions of the fingers 62c, may be varied to obtain suitable separation and reassembly forces.

The fourth embodiment shown in FIG. 5 also uses a one-piece guide 44c which is made of a plastic material and combines the guide 44 with the snap ring 46 of the prior embodiments to save material and labor assembly costs.

With each of the embodiments illustrated, a very compact and efficient breakaway-swivel unit is provided. By combining the swivel structure and the breakaway structure in the manner illustrated, only a single body is provided for both portions of the unit. Further, because a single unit is provided, only two connections are required to install the unit in the system, one of which connects to the nozzle and the other of which connects to the hose. Therefore, the number of possible leakage locations is reduced when compared to separate units. Since both the swivel structure and the breakaway structure are combined into one compact and lightweight assembly, the unit may be installed at the nozzle without user objection to the weight or bulk of the unit. This permits the elimination of a third component—a flexible spacer hose—which is required with the prior art units mounted at the dispenser. The combination of all three components into one also reduces system pressure drop. Further, because fewer parts are required, lower manufacturing costs are encountered and maintenance and repair are simplified.

Although the preferred embodiments of this invention have been shown and described, it should be understood that various modifications and rearrangements of the parts may be resorted to without departing from the scope of the invention as disclosed and claimed herein.

What is claimed is:

1. A nozzle assembly for fueling vehicles, comprising:
   a nozzle having valve means for controlling the flow of fuel therethrough;
   a supply hose connected to a source of fuel under pressure; and
   a breakaway-swivel assembly directly attached to said nozzle and said hose, said breakaway-swivel assembly including
   a body having a swivel portion and a breakaway portion,
   a swivel fitting attached at one end to one of said nozzle and said hose, said swivel fitting mating in a swivel connection at the other end with said swivel portion of said body, said swivel fitting cooperating with said swivel portion of said body to provide a fluidtight swivel connection allowing swivel movement of said nozzle with respect to said hose,
   a breakaway fitting attached at one end to the other of said nozzle and said hose, said breakaway fitting mating at the other end with said breakaway portion of said body, said breakaway fitting cooperating with said breakaway portion of said body to provide a fluidtight joint therebetween, said breakaway fitting and said breakaway portion being separable without breaking said hose when a predetermined separation force is applied to said nozzle and being swivelable with respect to said swivel fitting, and
   shutoff valve means in said breakaway-swivel assembly operable to close in response to separation of said breakaway portion and operating to prevent continued flow of fuel from said hose.

2. A nozzle assembly as set forth in claim 1, wherein said breakaway fitting and said body are normally connected by frangible means which break when said predetermined separation force is applied therebetween.

3. A nozzle assembly as set forth in claim 2, wherein said frangible means provides a plurality of frangible fasteners peripherally spaced around said breakaway fitting, replacement of new frangible fasteners permitting reassembly of said breakaway assembly.

4. A nozzle assembly as set forth in claim 3, wherein said valve means includes a first shutoff valve in said body and a second shutoff valve in said breakaway fitting, separation of said breakaway fitting and said body causing both of said shutoff valves to close to prevent fuel from spilling from both said hose and said nozzle.

5. A nozzle assembly as set forth in claim 1, wherein said valve means includes a first shutoff valve in said body and a second shutoff valve in said breakaway fitting, separation of said breakaway fitting from said body causing both of said shutoff valves to close to prevent fuel from spilling from said hose and said nozzle.

6. A nozzle assembly as set forth in claim 1, wherein resilient means normally connect said breakaway fitting and said body, said resilient means permitting separation of said breakaway fitting and body when said predetermined separation force is applied therebetween without damage to said breakaway-swivel assembly.

7. A nozzle assembly as set forth in claim 6, wherein said resilient means includes a projection engaging a wall surface which is cammed away from said wall surface when said predetermined separation force is applied.

8. A nozzle assembly as set forth in claim 7, wherein said projection includes a cantilever finger projecting into a recess.

9. A nozzle assembly as set forth in claim 8, wherein during reassembly of said breakaway-swivel assembly said finger is cammed from its unstressed position and is repositioned in said recess.

10. A nozzle assembly as set forth in claim 9, wherein said recess is an annular groove, and said resilient means includes a plurality of said fingers peripherally spaces around said breakaway-swivel assembly.

11. A nozzle assembly as set forth in claim 7, wherein said projection includes a cantilever finger engaging an inclined wall surface.

12. A nozzle assembly as set forth in claim 6, wherein said resilient means includes an annular elastomeric member mounted on one of said body and said breakaway fitting peripherally gripping the other of said body and breakaway fitting, said elastomeric member being elastically deformed when said predetermined separation force is applied causing said elastomeric member to release said other of said body and said breakaway fitting.

13. A nozzle assembly as set forth in claim 12, wherein said breakaway-swivel assembly is reassembled by inserting said other of said body and breakaway fitting into said elastomeric member.

14. A nozzle assembly as set forth in claim 1, wherein said breakaway-swivel assembly is mounted directly on said nozzle, and said shutoff valve means only shuts off said hose when said body and breakaway fitting separate.

15. A breakaway-swivel assembly for use on vehicle fueling nozzles comprising:
    a body, said body having a fluid passage;
    a swivel fitting mounted on said body adapted to connect to a fueling nozzle, said swivel fitting cooperating with said body to provide a fluidtight swivel connection allowing swivel movement of said swivel fitting with respect to said body;
    a breakaway fitting mounted on said body adapted to connect to a supply of fuel under pressure, said breakaway fitting being swivelable with respect to said swivel fitting and separable from said body when a predetermined separation force is applied there-between; and
    valve means operable to close and prevent flows through said breakaway fitting when said breakaway fitting separates from said body.

16. A breakaway-swivel assembly as set forth in claim 15, wherein said breakaway fitting in said body can be reassembled causing said shutoff valve to open.

17. A nozzle assembly for fueling vehicles, comprising:
    a nozzle having valve means for controlling the flow of fuel therethrough;
    a supply hose connected to a source of fuel under pressure; and
    a breakaway-swivel assembly directly mounted on said nozzle and directly attached to said hose, said breakaway-swivel assembly including
    a swivel fitting attached at one end to one of said nozzle and said hose, a breakaway fitting attached at one end to the other of said nozzle and said hose, said breakaway fitting connected at the other end to the other end of said swivel fitting, said swivel fitting cooperating with said breakaway fitting to provide a fluidtight separable swivel connection allowing swivel movement between said swivel fitting and said breakaway fitting when said nozzle swivels with respect to said hose while allowing said breakaway fitting and said swivel fitting to be separable without breaking said hose when a predetermined separation force is applied to said nozzle, and shutoff valve means in said breakaway-swivel assembly operable to close in response to separation of said breakaway fitting and said swivel fitting and operating to prevent continued flow of fuel from said hose.

* * * * *